(12) United States Patent
Adams et al.

(10) Patent No.: US 9,155,242 B2
(45) Date of Patent: Oct. 13, 2015

(54) LOW TORQUE AND VACUUM SEED METER

(71) Applicant: CNH America LLC, New Holland, PA (US)

(72) Inventors: Brian T. Adams, Centralia, MO (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 78 days.

(21) Appl. No.: 13/732,706

(22) Filed: Jan. 2, 2013

(65) Prior Publication Data

US 2014/0182493 A1    Jul. 3, 2014

(51) Int. Cl.
*A01C 7/04* (2006.01)
*A01C 7/12* (2006.01)

(52) U.S. Cl.
CPC ............... *A01C 7/046* (2013.01); *A01C 7/125* (2013.01)

(58) Field of Classification Search
CPC ............ A01C 7/00; A01C 7/04; A01C 7/042; A01C 7/044; A01C 7/046; A01C 7/08; A01C 7/082; A01C 7/10; A01C 7/102; A01C 7/12; A01C 7/123; A01C 7/125; A01C 7/127; A01C 7/128; A01C 7/16; A01C 7/206; A01C 7/208; A01C 23/007; A01C 23/00; A01C 23/008
USPC .......................................... 111/177–185, 170
See application file for complete search history.

(56) References Cited

U.S. PATENT DOCUMENTS

| 7,334,532 | B2 | 2/2008 | Sauder et al. |
|---|---|---|---|
| 7,478,603 | B2 | 1/2009 | Riewerts et al. |
| 7,854,066 | B2 | 12/2010 | Wendte |
| 8,166,896 | B2 | 5/2012 | Shoup |
| 2005/0204972 | A1 | 9/2005 | Eben et al. |
| 2005/0224510 | A1 | 10/2005 | Remis et al. |
| 2009/0090284 | A1 | 4/2009 | Peterson, Jr. et al. |
| 2011/0120356 | A1 | 5/2011 | Wendte et al. |

*Primary Examiner* — Christopher J Novosad
(74) *Attorney, Agent, or Firm* — Rebecca L. Henkel

(57) ABSTRACT

A seed meter is provided for use with a row crop planter or seed planter that includes a seed disk assembly that rotates within a meter housing cavity and that has a seed disk assembly cavity in which a vacuum pressure is applied for pulling seeds into seed pockets of a seed disk of the seed disk assembly. The vacuum pressure is applied to the seed disk assembly by pulling a vacuum airflow through a collector of a spindle-mounted hub support that is fluidly connected through a face seal arrangement with a hub face of the seed disk assembly.

19 Claims, 6 Drawing Sheets

LOW TORQUE AND VACUUM SEED METER

FIELD OF THE INVENTION

The invention relates generally to row-crop planters or seeders and, in particular, to seed disk rotational mounting arrangements and air sealing assemblies for seed meters.

BACKGROUND OF THE INVENTION

Modern farming practices strive to minimize operating expenses. One way of reducing operating expenses is to operate the farm equipment at relatively faster speeds, which reduces the amount of operating time to complete certain tasks. When operating equipment at faster speeds, it can be important to maintain the quality of operation that can be achieved while operating at relatively slower operating speeds. This can be especially difficult to accomplish during planting and seeding operations that require precise seed depth placement and spacing accuracy in order to maintain a good seed environment. Accordingly, seed meter functionality can be very important in modern farming practices to obtain profitability.

Another way of reducing operating expenses is to use relatively more efficient farm equipment that requires less fuel to operate for a given operational time period when compared to less efficient equipment. Some seed meters create a negative pressure between a seed disk and a seed cover component of an outer housing of the seed meter. This tends to pull the seed disk against the seed cover outer housing component which creates a frictional braking force that must be overcome when rotating the seed disks of such typical seed meters. Attempts have been made to reduce those effects by providing seed meters with rotating vacuum chambers. Such seed meters apply a vacuum pressure to the entire inside space of the rotating vacuum chamber and require a complex array of numerous flexible fingers. Each flexible finger periodically bends to mechanically cover an individual opening of the seed disk to cut off vacuum to that opening, and has a wire that inserts into the opening to release the seed from the opening.

SUMMARY OF THE INVENTION

The present invention is directed to a seed meter which provides improved uniformity of seed placement during row crop planting and that is highly efficient so as to require relatively little power to operate when compared to less efficient seed meters. The seed meter may include a seed disk assembly having a seed disk and a hub and that is supported for low-drag rotation about a spindle by way of bearings and a hub support that are supported by the spindle. The seed disk may include seed pockets which are fluidly connected to a collector or a blocker of the hub support so as to expose the seed pockets to a vacuum pressure or an ambient or greater pressure, respectively. A face seal arrangement may be defined by the hub support and a face of the hub so that when the seed disk rotates, the hub face also rotates to engage a sealing surface(s) of the hub support for directing vacuum air flow(s) therethrough and a vented surface(s) of the hub support for blocking the vacuum air flow(s), allowing seeds to fall freely away from some of the seed pockets during delivery. This may allow the sealing interfaces of rotating components of the seed meter to be arranged relatively close to an axis of rotation of such rotating components while allowing the rotating components to be driven radially outward of the sealing interfaces which may provide a mechanical advantage for overcoming any braking forces associated with the sealing interfaces.

According to one aspect of the invention, a seed meter is provided that includes a meter housing defining a housing cavity temporarily holding seeds for individual dispensing from the seed meter and a seed outlet allowing individual seeds to exit the housing assembly for conveyance through a seed tube to an agricultural field. A seed disk assembly is arranged inside of the housing cavity and may include a seed disk rotatable in the housing cavity and defining seed pockets being spaced from each other for conveying individual seeds through the seed meter. A hub may be arranged for supporting the seed disk so that the hub and seed disk are locked into rotational unison with each other. The hub may define hub passages that are fluidly connected to respective seed pockets for connecting the seed pockets to a vacuum source for holding the individual seeds in the seed pockets by way of vacuum pressure. A hub support may be fixed in the housing cavity and engage the hub so as to support the hub for rotation with respect thereto and for simultaneously permitting vacuum airflows through a first set of the hub passages and blocking vacuum airflows through a second set of the hub passages that is different than the first set of hub passages. This may allow for an arrangement in which an outer periphery of the seed disk is not pulled against a fixed housing component of the seed meter which may reduce frictional braking forces within the seed meter.

According to another aspect of the invention, a hub face of the hub may define hub passage inner openings that are arranged at inner ends of the hub passages. The hub passage inner openings may rotate across the collector which exposes the hub passage inner openings to a vacuum pressure and across the blocker which exposes the hub passage inner openings an ambient or greater pressure. The collector and blocker may be at least partially defined by a hub support face that engages the hub face such that the hub face slides across the hub support face during rotation of the seed disk. The hub support face may include a sealing surface and a vented surface. The sealing surface may seal against the hub face while the hub face slides across the hub support face during rotation of the seed disk for defining a passage through which the vacuum airflows of the hub passages can flow into the housing spindle. The passage may define a vacuum collector passage at which the separate hub passage vacuum airflows merge with each other to flow as a single combined vacuum airflow through the rest of the hub support and toward the vacuum source. The vented surface may include at least one recess that extends into the hub support face for exposing the vented surface to an ambient or greater pressure. This may allow for a face sealing-type arrangement of simple construction that can distribute a vacuum airflow through portions of the seed disk while exposing other portions of the seed disk to an ambient or greater pressure.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
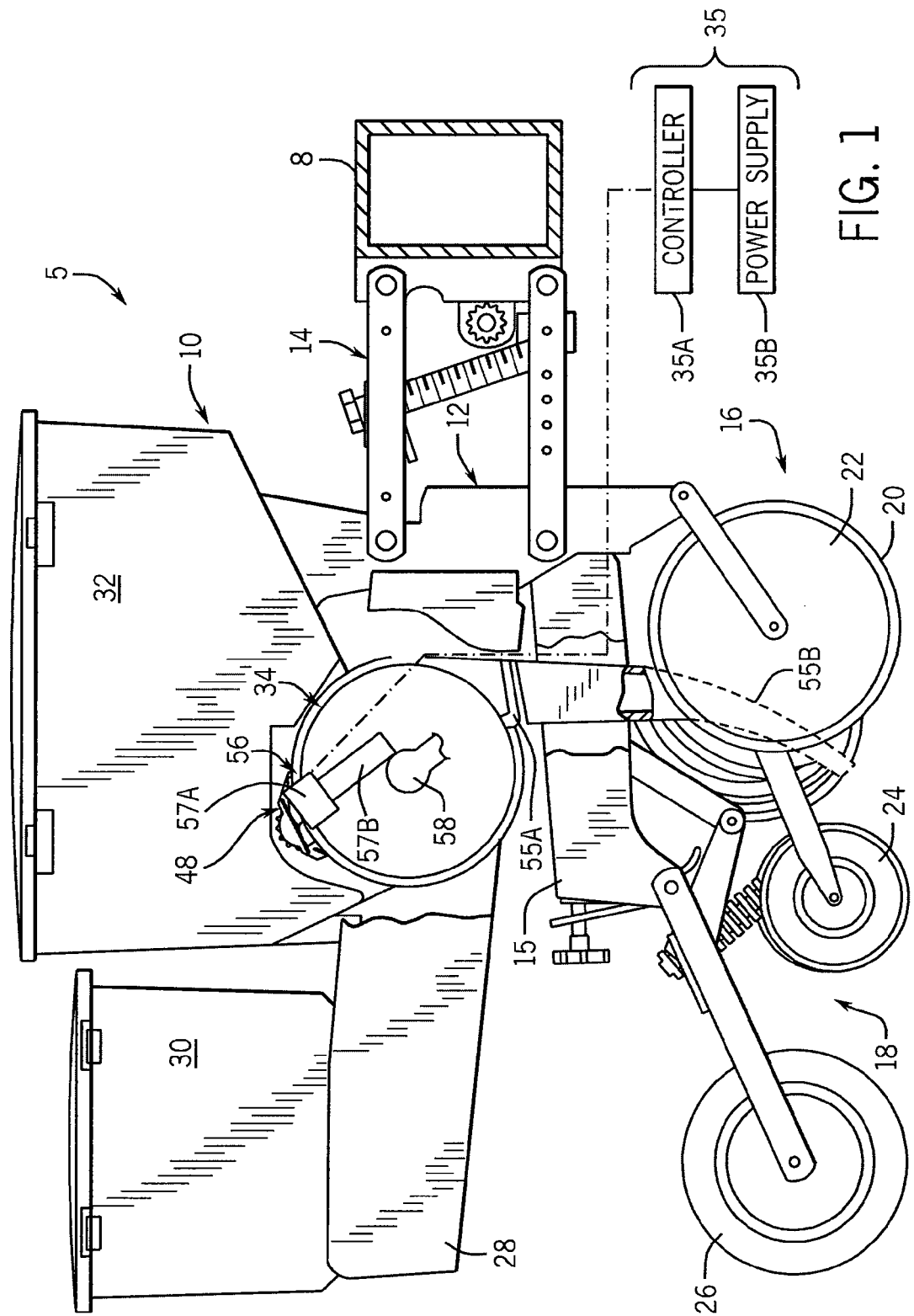
FIG. 1 illustrates a side elevational view of a portion of a seed planter incorporating a seed meter in accordance with the present invention.

Referring now to the drawings and specifically to FIG. 1, a portion of a multiple row crop planter implement or seed planter 5 is shown. The seed planter 5 is typically pulled by a tractor or other traction device (not shown). Seed planter 5 includes a main frame 8 that holds multiple individual row planting units 10, each row planting unit 10 being substantially identical. Only a single row planting unit 10 is shown for simplicity sake.

Still referring to FIG. 1, row planting unit 10 includes a sub-frame 12 that is connected to the main frame 8 by way of a parallel linkage system 14. The sub-frame 12 includes a backbone 15 that supports a furrow opening mechanism 16 and a furrow closing mechanism 18 that is arranged behind the furrow opening mechanism 16. The furrow opening mechanism 16 includes an opener disk(s) 20 that penetrates the soil and creates a furrow and gauge wheel 22 that has a limited displacement relative to the opener disk(s) 20. This allows the depth of the furrow to be selected by an operator by adjusting the amount of permitted movement of the gauge wheel 22 so as to control the depth to which the opener disk(s) 20 can penetrate the soil. The furrow closing mechanism 18 includes a closing disk(s) 24 that closes the furrow after the row planting unit 10 deposits seeds into the furrow and a press wheel 26 that rolls over the closed furrow to firm the soil over the seed to further close the furrow and promote favorable seed to soil contact.

Still referring to FIG. 1, the sub-frame includes a shelf 28 that is arranged above and generally parallel to the backbone 15. Shelf 28 is shown supporting an optional pesticide hopper 30 that contains, e.g., an herbicide or an insecticide, along with a known pesticide dispensing system (not shown) for applying controlled amounts of the contents in the desired location(s) while using the seed planter 5. Shelf 28 also supports a seed hopper 32 that holds the seed supply for planting by the row planting unit 10. The particular seed hopper 32 shown in FIG. 1 is configured to store the seed material row planting unit 10. In another embodiment, the seed is held in bulk storage in a primary seed hopper at a remote location, spaced from the various row planting units 10, whereby the seeds are supplied to the row planting units 10 pneumatically, or otherwise, through a seed conduit. Regardless of the particular configuration of seed hopper 32, the seeds are directed from the seed hopper 32 to a seed meter 34. A known vacuum source (not shown) is operably connected to a seed meter 34 for drawing a vacuum airflow to create a vacuum pressure inside of the seed meter 34, as described in greater detail elsewhere herein. Seed meter 34 is operably connected to a control system 35 that includes a controller 35A and power supply 35B, as is known, for controlling the seed meter 34. The controller 35A can include an industrial computer or, e.g., a programmable logic controller (PLC), along with corresponding software and suitable memory for storing such software and hardware including interconnecting conductors for power and signal transmission for controlling electronic or electro-mechanical components of the system seed meter 34.

Figure 2:
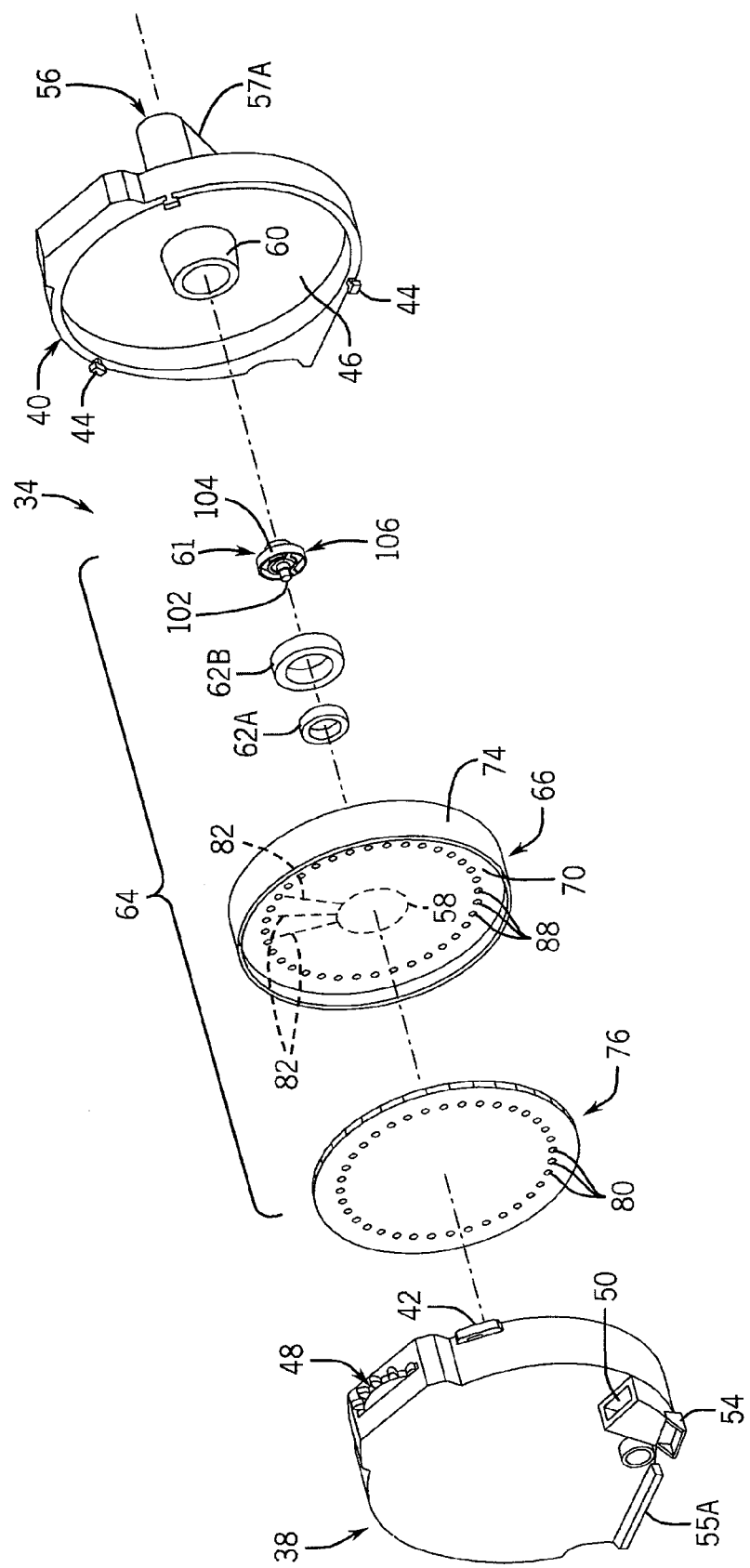
FIG. 2 illustrates an exploded pictorial view of the seed meter shown in FIG. 1 taken from above and behind the meter cover.
Figure 3:
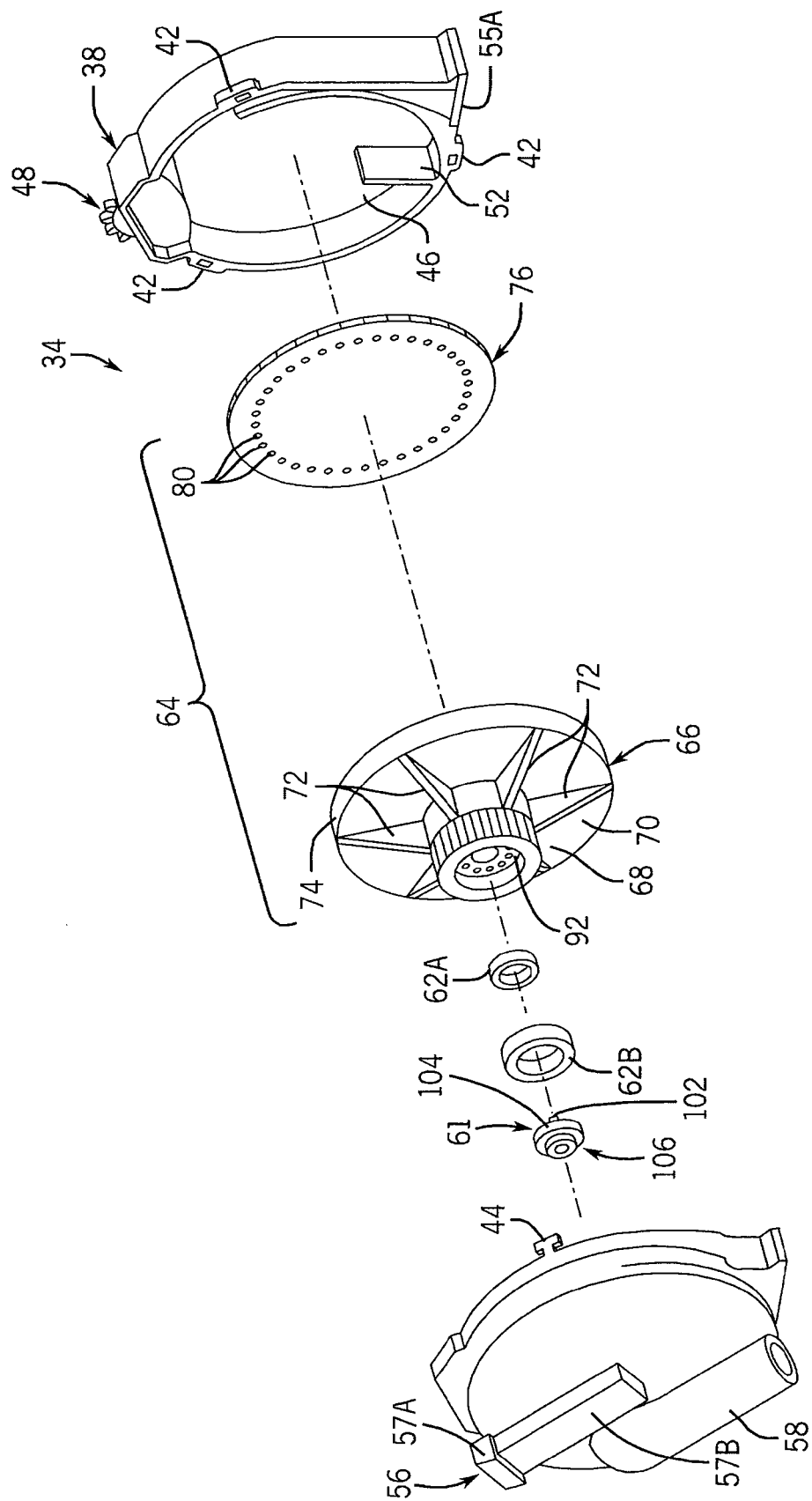
FIG. 3 illustrates an exploded pictorial view of the seed meter shown in FIG. 1 taken from above and behind the seed disk assembly cover.

Referring now to FIGS. 2 and 3, the seed meter 34 includes a multi-component meter housing that supports the entire seed meter 34 and its components and temporarily holds the seed that is being metered. The multi-component meter housing includes a meter cover 38 and a seed disk assembly cover 40 that engage each other at respective outer peripheries. The meter cover 38 and seed disk assembly cover 40 include slots 42 and tabs 44 that engage each other upon rotation of the meter and seed covers 38, 40 so as to secure the meter and seed disk assembly covers 38, 40 together in a cam-locking-type manner. In another embodiment, latches (not shown) are provided on the meter and seed disk assembly covers 38, 40 for securing the meter and seed disk assembly covers 38, 40 together. When the meter and seed disk assembly covers 38, 40 are secured together, the meter housing defines an enclosure with a meter housing cavity 46 therein.

Referring to FIGS. 2 and 3, a seed singulator 48 that is configured to inhibit more than one seed from being discharged from the seed meter 34 per seed discharge event is arranged on the meter housing. A seed opening 50 (FIG. 2) extends into the meter cover 38 and provides an entry through which the seed enters the seed meter 34 and is held in an area of the meter housing cavity 46 that is confined by a divider wall 52 (FIG. 3) and seed disk 76. A hinged cover door 54 (FIG. 2) covers a seed clean-out exit hole (not shown) that can be pivoted open and serves as a funnel to clean out the seed meter 34 when it is not being used. A seed outlet 55A directs the seed being delivered out of the seed meter 34 and to a seed tube 55B (FIGS. 1 and 4) for depositing the seed into a seed bed. A drive assembly 56 is mounted to the meter cover 38 for driving the rotating components of the seed meter 34. Drive assembly 56 is schematically shown as a worm gear drive that includes a drive motor 57A that may be a stepper motor which delivers power to a gearbox 57B (FIG. 3). Another suitable drive assembly 56 is disclosed in commonly owned U.S. Pat. No. 7,617,785, entitled Direct Electric Drive Seed Meter, which is incorporated herein by reference in its entirety. It is understood that the drive assembly 56 may have other configurations to mechanically drive the seed meter 34, such as drive shafts, chains and belts, peg and hole drive systems, and others.

Still referring to FIGS. 2 and 3, vacuum inlet 58 (FIG. 3) is connected by way of a vacuum supply hose (not shown) to the vacuum source. The vacuum inlet 58 (FIG. 3) connects to a spindle 60 (FIG. 2) that extends from an inwardly facing surface of the seed disk assembly cover 40, axially into the meter housing cavity 46. A hub support 61 is arranged on the spindle 60 and a pair of bearings 62A, 62B is arranged on the hub support 61 so as to support the seed disk assembly 64 for rotation upon the hub support 61. The hub support 61 cooperates with the seed disk assembly 64 to fluidly connect portions of the seed disk assembly 64 to the vacuum source and block fluid connection of other portions of the seed disk assembly 64, as explained in greater detail elsewhere herein.

Referring to FIG. 3, the seed disk assembly 64 includes a support plate 66 that has a hub 68 in which the bearings 62A, 62B are mounted, and a back wall 70 that is attached to an end of the hub 68. Multiple support webs 72 extend between and connect an outer circumferential surface of the hub 68 to a rearward facing surface of the back wall 70. Referring to FIG. 2, a collar 74 extends in an axial direction from an outer perimeter of the support plate back wall 70. A seed disk 76 is mounted nested inside the support plate collar 74 and abutting the support plate back wall 70. Referring again to FIGS. 2 and 3, the seed disk 76 can be mounted to the support plate collar 74 by way of screws or other fasteners. This may allow the seed disk 76 to be removed from the support plate collar 74 for installation of another seed disk 76 so as to accommodate different seed disks 76 for planting different types of seed. In yet another embodiment, the support plate 66, collar 74, and seed disk 76 are not separate but are instead integral with each other to form a unit which may be removed from the rest of the seed disk assembly 64 and replaced with a different unit for planting different types of seed.

Still referring to FIG. 3, in this embodiment, the hub 68 has a geared outer circumferential surface with radially extending gear teeth that intermesh with the drive gear(s) of the drive assembly 56, which allows the seed disk assembly 64 to be rotated by the drive assembly 56. As is known, seed disk 76 includes seed pockets 80 that are discrete openings that include holes that extend between front and back surfaces and thus through the entire thickness of the seed disk 76. The seed pockets 80 are spaced from each other and, in this embodiment, are arranged in a single circle-shaped pattern. In other embodiments of the seed disk 76 that are configured for planting relatively small seeds like soybeans and sorghum, relatively more seed pockets 80 are provided and are arranged in patterns of multiple concentric circles so that the seed pockets 80 occupy a relatively larger percentage of the surface area of the seed disk 76.

Figure 4:
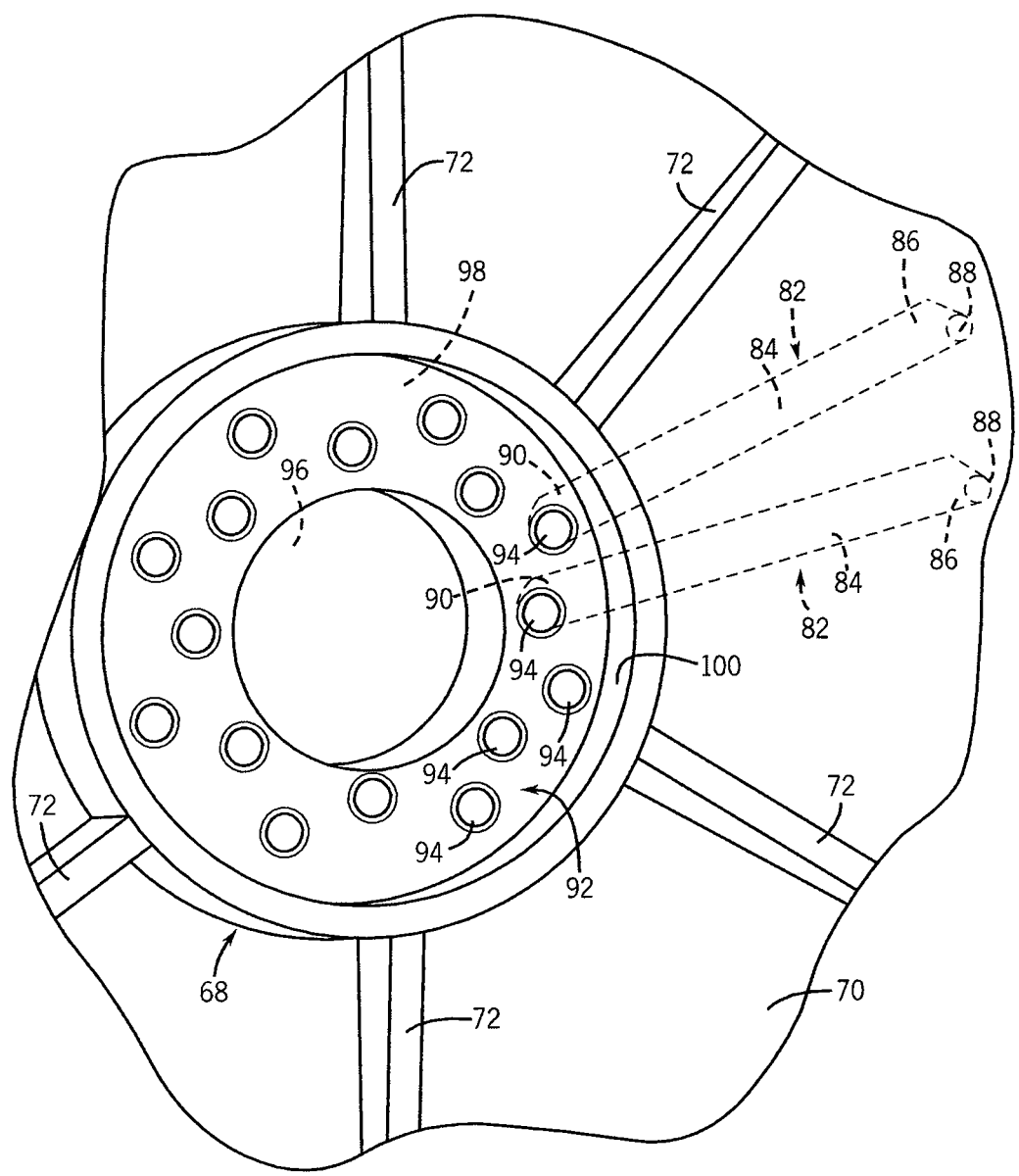
FIG. 4 illustrates a close-up pictorial view of a portion of hub of a variant of the seed disk assembly of FIGS. 2 and 3.

Still referring to FIG. 3, hub passages 82 extend between the hub 68 in the seed disk 76 for fluidly connecting the seed pockets 80 to the vacuum source. Referring to FIG. 4, each hub passage 82 includes a main segment 84 that defines a longitudinally extending bore that extends in a radial direction through the back wall 70 of the seed disk assembly 64. The hub passages 82 have outer ends 86 that curve away from the main body segments 84, about 90 degrees, toward an outwardly facing surface of the back wall 70 that faces toward the seed disk 76. Hub passage outer openings 88 are defined at the back wall 70 so as to permit access to the outer ends 86 through the back wall 70. As shown in FIG. 2, the hub passage outer openings 88 are aligned with the seed pockets 80 of the seed disk 76. In the complete assemblage, the seed disk 76 and back wall 70 are sealed against each other so that the hub passage outer openings 88 define points of intersection between the respective hub passages 82 and seed pockets 80. Referring to FIG. 4, the hub passage outer openings 88 define smaller opening widths than widths of the seed pockets 80 and the widths of the hub passages 82. This restriction between the seed pockets 80 and the hub passages 82 allows any debris that can fit through the hub passage outer openings 88 to flow freely through the hub passages 82 so as to not clog the hub passages 82.

Still referring to FIG. 4, the hub passages 82 have inner ends 90 that curve away from the main body segments 84, about 90 degrees in the opposite direction of the outer ends 86, toward an outwardly facing surface of the hub 86 that defines a hub face 92. Hub passage inner openings 94 are defined at the hub face 92 so as to permit access to the inner ends 90 through the hub face 92. The hub passages inner openings 94 are spaced from each other about the hub face 92 which provides the hub face 92 with a perforated configuration leading to the multiple hub passages 82 and thus the seed pockets 80 of seed disk 76.

Still referring to FIG. 4, a bore 96 extends axially into the middle of the hub face 92 and receives an outer race of the bearings 62A. A counter bore 98 is defined concentrically inside of a circumferential side wall 100 of the hub 68 and receives an outer race of the bearings 62B. Referring again to FIGS. 2 and 3, at the hub support 61, an inner race of the bearings 62A is supported on a spindle 102 of the hub support 61. An inner race of the bearings 62B is supported on a circumferential side wall 104 of a main body 106 of the hub support 61. This arrangement allows at least a portion of the hub support 61 to be nested within the counter bore 98 of the hub 68 so that the hub support 61 and hub face 92 are in face-to-face engagement which allows the hub face 92 to wipe across the fixed hub support 61 during rotation of the seed disk 76. This allows for simultaneously permitting vacuum flow through some of the hub passages 82 that are aligned with some portions of the hub support 61 that are connected to the vacuum source while blocking vacuum flow through other hub passages 82 that are aligned with other portions of the hub support 61 that are vented or otherwise not connected to the vacuum source.

Figure 5:
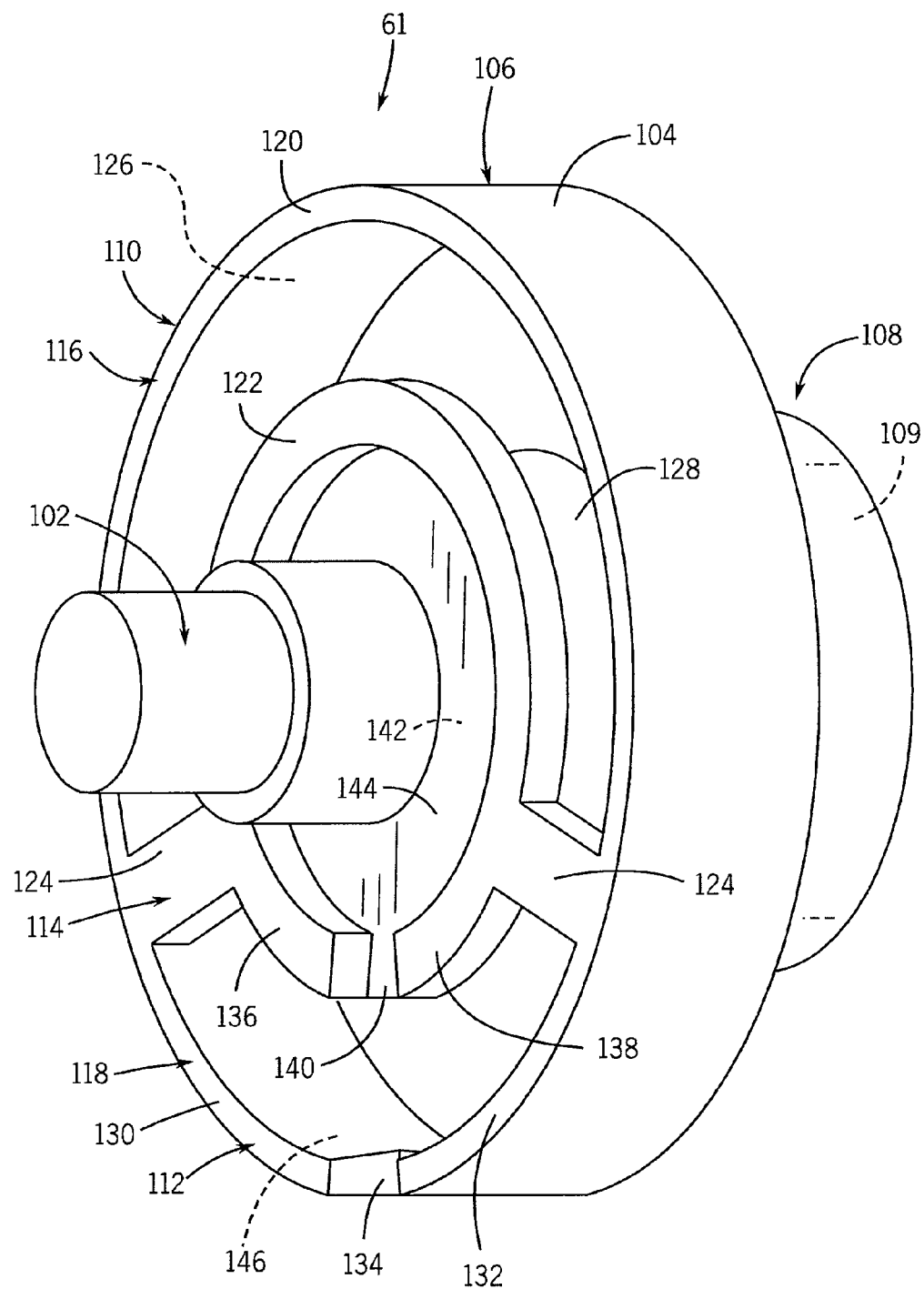
FIG. 5 illustrates a close-up pictorial view of the hub support of FIGS. 2 and 3.

Referring now to FIG. 5, a collar 108 extends away from the main body 106 of the hub support 61 in the opposite direction of the hub support spindle 102. The collar 108 has a bore 109 that is in fluid communication with a bore extending through the spindle 60 so that the collar 108 and the vacuum inlet 58 are connected through the intermediary spindle 60. The collar 108 may be mounted outside or inside of the spindle 60 to provide the fluid communication between the vacuum inlet 58 and the hub support 61. The main body 106 of the hub support 61 includes a collector 110 that is in fluid communication with the vacuum source and a blocker 112 that is not in fluid communication with the vacuum source.

Still referring to FIG. 5, the main body 106 of the hub support 61 includes a hub support face 114 that defines portions of both the collector and blocker 110, 112 as a sealing surface 116 and a vented surface 118, respectively. The sealing surface 116 is defined by an outer segment 120 and an inner segment 122 that are spaced from each other and interconnected at respective ends by a pair of end segments 124. The sealing surface 116 may be made from a polymeric and/or elastomeric material or may include separate seals that are made from such materials for providing a substantially airtight seal at the interface between the sealing surface 116 and the hub face 92. As shown in FIG. 5, the outer, inner, and end segments 120, 122, 124 collectively define a generally U-shaped continuously-extending perimeter about an opening of a vacuum collector passage 126 that extends into the collector 110. The vacuum collector passage 126 is fluidly connected to an inner opening 128 of the bore 109 of the collar 108, whereby the vacuum collector passage 126 is fluidly connected to the vacuum source.

Still referring to FIG. 5, the vented surface 118 includes a discontinuous outer segment having two portions 130, 132 that are longitudinally separated by a recess 134 that extends into the outer segment. A discontinuous inner segment of the vented surface 118 has two portions 136, 138 that are longitudinally separated by a recess 140 that extends into the discontinuous inner segment. The recess 140 is connected to a space 142 that is arranged outwardly of a support plate 144 from which the hub support spindle 102 extends and that is recessed below the hub support face 114 and is transversely spaced from the inner opening 128 of the bore 109 of collar 108. The recess 140 also is connected into a venting pocket 146 that extends into the blocker 112 and has a perimeter that is defined by the vented surface 118. The recess 134 is connected to the meter housing cavity 46. In this way, the space 142, recess 140, venting pocket 146, and recess 134 are all exposed to an ambient or greater pressure which is present within the housing cavity 46 and all are blocked from fluid communication with the vacuum source.

Figure 6:
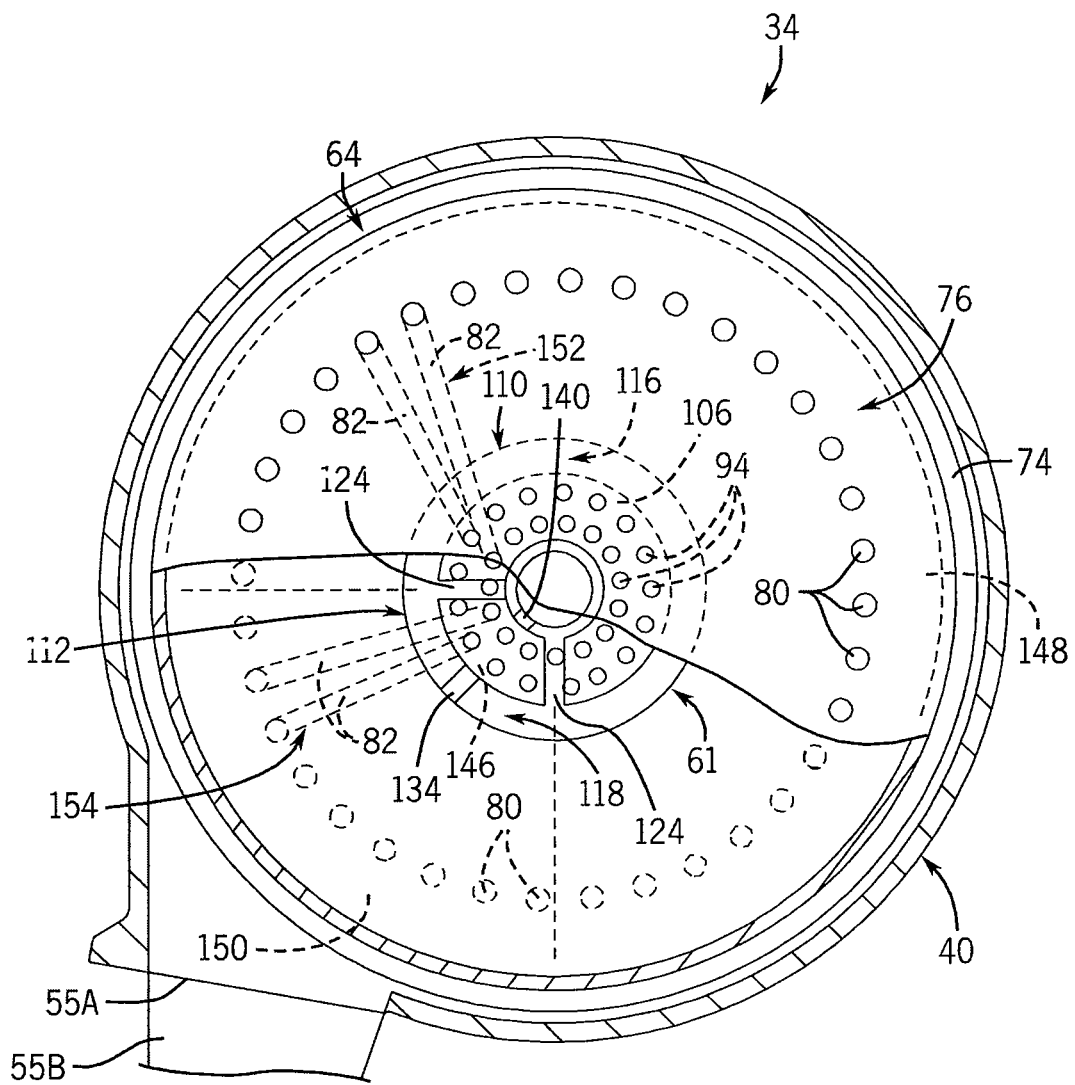
FIG. 6 illustrates a partial cross-sectional view of the seed meter of FIG. 1.

Referring to FIG. 6, the seed disk assembly 64 defines a vacuum zone 148 in which some of the seed pockets 80 are fluidly connected to the vacuum source and a non-vacuum zone 150 in which other seed pockets 80 are blocked from a fluid connection with the vacuum source. At a given time during rotation of the support plate 66 and seed disk 76, the seed pockets 80 that are arranged within the vacuum zone 148 are those that are connected to a first set 152 of hub passages 82, only some of which are shown in phantom, having hub passage inner openings 94 which align with the collector 110. At that same time, the seed pockets 80 that are arranged within the non-vacuum zone 150 are connected to a second set 154 of hub passages 82 having hub passage inner openings 94 which align with the blocker 112.

In light of the above, during use of the seed meter 34, seed is delivered from the seed hopper 32 (FIG. 1) through the seed opening 50 (FIG. 2), and is temporarily held in the meter housing cavity 46 (FIG. 2) in an area that is confined by the divider wall 52 and seed disc 76 (FIG. 3). The drive assembly 56 rotates the seed disk assembly 64 at a rotational speed that corresponds to the ground speed of the particular row planting unit 10. The vacuum source pulls a vacuum airflow from the seed pockets 80 in the vacuum zone 148 (FIG. 6.), which is directed through the hub passages 82, a vacuum collector passage 126, inner opening 128 of the collar bore 109, through the seed assembly cover spindle 60 (FIG. 2), and through the vacuum inlet 58 and vacuum supply hose to the vacuum source. Seed pockets 80 that rotate into the vacuum zone 148 are subjected to the negative pressure, whereby air is drawn through the respective seed pockets 80 which pull and hold seeds from the meter housing cavity 46 into the seed pockets 80. The vacuum pressure holds the seeds in the seed pockets 80 while the seed disk 76 and support plate 66 rotate until the seed pockets 80 rotate into the non-vacuum zone 150, at which point the pockets 80 are no longer subjected to the vacuum pressure inside of the seed disk assembly 64. Air at ambient or greater pressure within the meter housing cavity 46 (FIG. 2) flows into the non-vacuum zone 150 through the holes of the empty pockets 80 and through the recesses and 134, 140 and into the venting pocket 146 so as to subject the seed pockets 80 that are fluidly connected to the non-vacuum zone 150 to ambient or greater air pressure. This removes the vacuum pressure at the non-vacuum zone 150 that holds the seeds in the pockets 80, and the seeds fall from the pockets 80 by gravity through the seed outlet 55A and seed tube 55B (FIGS. 1 and 6) and into the seed bed.

Many changes and modifications could be made to the invention without departing from the spirit thereof. The scope of these changes will become apparent from the appended claims.

We claim:

1. A seed meter, comprising;
  a meter housing defining a housing cavity temporarily holding seeds for individual dispensing and a seed outlet allowing individual seeds to exit the meter housing for conveyance through a seed tube to an agricultural field; and
  a seed disk assembly arranged inside of the housing cavity and including,
    a seed disk rotatable in the housing cavity and defining seed pockets being spaced from each other for conveying individual seeds to the seed outlet and radially extending hub segments, each hub segment having a first end communicating with a corresponding seed pocket and a second end;
    a hub arranged for supporting the seed disk and locked into rotation therewith and defining hub passages that are fluidly connected to respective hub segments for connecting the seed pockets to a vacuum source for holding the individual seeds in the seed pockets by way of vacuum pressure; and
    a hub support fixed in the housing cavity and engaging the hub so as to support the hub for rotation with respect thereto, the hub support defining a vacuum chamber communicating with the vacuum source and non-vacuum chamber isolated from the vacuum source, the hub support configured for simultaneously permitting communication between the vacuum chamber and a first set of the hub passages and communication between the non-vacuum chamber and a second set of the hub passages
  wherein the first and second sets of hub passages are varied in response to rotation of the hub.

2. The seed meter of claim 1 wherein the hub includes a hub face defining hub passage inner openings arranged at inner ends of the hub passages.

3. The seed meter of claim 2 wherein the seed pockets define widths thereof and outer ends of the hub segments define hub segments outer openings at points of intersection between the hub segments and the seed pockets, and wherein the hub segments outer openings define smaller widths than widths of the seed pockets.

4. The seed meter of claim 1 wherein the meter housing includes a housing spindle that is hollow and connected to the vacuum source and that extends inwardly into the housing cavity and wherein the hub support is arranged on the housing spindle for directing vacuum airflows of the first set of hub passages into the housing spindle.

5. The seed meter of claim 4 wherein the hub support includes a huh support face and the hub includes a hub face, the hub support face engaging the hub face such that the hub face slides across the hub support face during rotation of the seed disk.

6. The seed meter of claim 5 wherein the hub support face includes a sealing surface that seals against the hub face while the hub face slides across the hub support face during rotation of the seed disk, the sealing surface defining the vacuum chamber communicating with the first set off hub passages such that the vacuum can flow into the housing spindle.

7. The seed meter of claim 6 wherein the hub face defines hub passage inner openings arranged at inner ends of the hub passages and wherein the sealing surface includes an outer segment and an inner segment that are spaced from each other and are arranged to engage the hub face on opposing sides of the hub passage inner openings.

8. The seed meter of claim 7 wherein the sealing surface includes a pair of end segments that connect the outer and inner segments of the sealing surface at opposing sides of the sealing surface.

9. The seed meter of claim 8 wherein the first set of hub passages is defined by hub passages that are arranged inwardly of the outer segment, inner segment, and end segments of the sealing surface.

10. The seed meter of claim 8 wherein the outer segment, inner segment, and end segments of the sealing surface collectively define a periphery about an opening of a vacuum passage of the hub support for directing vacuum airflows of the first set of hub passages into the housing spindle.

11. The seed meter of claim 5 wherein the hub support face including a vented surface for allowing the second set of the hub passages to be exposed to an ambient or greater pressure such that the seeds can fall freely away from the seed disk at the seed pockets that are connected to the second set of hub passages.

12. The seed meter of claim 11 wherein the vented surface defines at least one recess that extends into the hub support face for exposing the vented surface to an ambient or greater pressure.

13. A seed meter, comprising:
a housing assembly defining a housing cavity temporarily holding seeds for individual dispensing from the seed meter and a seed outlet allowing individual seeds to exit the housing assembly for conveyance through a seed tube to an agricultural field; and
a seed disk assembly arranged inside of the housing cavity and including,
a seed disk rotatable in the housing cavity and defining seed pockets being spaced from each other for conveying individual seeds through the seed meter and radially extending hub segments, each hub segment having a first end communicating with a corresponding seed pocket and a second end;
a hub arranged for supporting the seed disk and locked into rotation therewith and defining hub passages that are fluidly connected to respective hub segments for connecting the seed pockets to a vacuum source so as to hold the seeds in the seed pockets by way of vacuum pressure, the hub including a hub face defining hub passage openings therethrough fluidly connected to respective hub passages; and
a hub support arranged in the housing cavity and supporting the hub for rotation with respect thereto, the hub support including a sealing surface engaging a first portion of the hub face and extending about a vacuum chamber connectable to a vacuum source for fluidly connecting a first set of the hub passages to the vacuum source and a vented surface engaging a second portion of the hub face and defining a non-vacuum chamber for connecting a second set of hub passages to an ambient or greater pressure.

14. The seed meter of claim 13 wherein the housing assembly includes a housing spindle that is hollow and connected to the vacuum source and that extends inwardly into the housing cavity and wherein the hub support is arranged on and fixed with respect to the housing spindle for directing vacuum airflows of the first set of hub passages from the vacuum chamber into the housing spindle.

15. The seed meter of claim 14 wherein the hub support includes a collector arranged between the hub and the housing spindle, and having interconnected walls that extend about the vacuum chamber aligned with the first set of hub passages so that all of the vacuum airflows of the first set of hub passages are directed from the hub into the vacuum chamber of the collector.

16. The seed meter of claim 14 wherein the hub support includes a blocker arranged between the hub and the housing spindle and partially defining the non-vacuum chamber aligned with the second set of hub passages and arranged to block vacuum airflows of the second set of hub passages from flowing into the spindle.

17. The seed meter of claim 16 wherein the blocker defines at least one recess extending thereinto for exposing the non-vacuum chamber to an ambient or greater pressure.

18. A seed meter, comprising:
a housing assembly defining a housing cavity temporarily holding seeds for individual dispensing from the seed meter and a seed outlet allowing individual seeds to exit the housing assembly for conveyance through a seed tube to an agricultural field; and
a seed disk assembly arranged inside of the housing cavity and including,
a seed disk rotatable in the housing cavity and defining seed pockets being spaced from each other for conveying individual seeds through the seed meter and radially extending hub segments, each hub segment having a first end communicating with a corresponding seed pocket and a second end;
a hub arranged for supporting the seed disk and locked into rotation therewith and defining hub passages that are fluidly connected to respective hub segments for connecting the seed pockets to a vacuum source so as to hold the seeds in the seed pockets by way of vacuum pressure, the hub including a hub face defining hub passage openings therethrough fluidly connected to the hub passages; and
a hub support arranged in the housing cavity and supporting the hub for rotation with respect thereto, the hub support including a collector having interconnected walls that extend about a vacuum chamber aligned with the a first set of hub passages for receiving vacuum airflows of the first set of hub passages and fluidly connecting the first set of hub passages to the vacuum source and a blocker defined a non-vacuum chamber aligned with a second set of hub passages, the blocker arranged to block vacuum airflows of the second set of hub passages from fluid connection with the vacuum source.

19. The seed meter of claim 18 wherein the blocker defines at least one recess fluidly connecting the non-vacuum chamber to the housing cavity for exposing the second set of hub passages to an ambient or greater pressure.

* * * * *